United States Patent [19]
Stehling et al.

[11] Patent Number: 6,089,253
[45] Date of Patent: Jul. 18, 2000

[54] FIRE HYDRANT SECURITY SYSTEMS

[75] Inventors: Henry J. Stehling, Bedford; Roy Istre, Houston, both of Tex.

[73] Assignee: Hydra-Shield Manufacturing, Inc., Irving, Tex.

[21] Appl. No.: 09/335,771

[22] Filed: Jun. 16, 1999

Related U.S. Application Data

[60] Provisional application No. 60/089,881, Jun. 19, 1998.

[51] Int. Cl.[7] ............................ F16K 35/06; F16K 35/16; E03B 9/06
[52] U.S. Cl. .......................... 137/296; 70/175; 70/176; 70/189; 70/276; 81/125.1; 81/176.1; 137/382; 220/284; 220/725; 220/726; 220/727; 251/65; 251/291
[58] Field of Search ............................ 70/175, 176, 177, 70/188, 189, 276; 81/125.1, 176.1, 176.15, 461; 137/272, 296, 377, 382; 220/284, 724, 725, 726, 727; 251/65, 291, 292; 192/84.1, 84.3

[56] References Cited

U.S. PATENT DOCUMENTS

| | | | |
|---|---|---|---|
| 2,118,233 | 5/1938 | Ruggio | 137/296 |
| 3,070,115 | 12/1962 | Jester | 137/296 |
| 3,453,655 | 7/1969 | Diaz | 137/296 |
| 3,840,041 | 10/1974 | McMurray | 137/296 |
| 3,916,939 | 11/1975 | Gilliard | 137/296 |
| 3,935,877 | 2/1976 | Franceschi | 137/296 |
| 4,033,372 | 7/1977 | Bowman | 137/296 |
| 4,484,595 | 11/1984 | Vanek et al. | 137/296 |
| 4,566,481 | 1/1986 | Leopold, Jr. et al. | 137/296 |
| 4,716,922 | 1/1988 | Camp | 137/296 |
| 4,936,336 | 6/1990 | McCauley et al. | 137/296 |
| 5,072,750 | 12/1991 | Poms et al. | 137/296 |
| 5,205,312 | 4/1993 | Jerman et al. | 137/296 |
| 5,469,724 | 11/1995 | Pollard | 137/296 |
| 5,596,893 | 1/1997 | Stehling et al. | 137/296 |
| 5,630,442 | 5/1997 | Julicher | 137/296 |

*Primary Examiner*—George L. Walton
*Attorney, Agent, or Firm*—Millen, White, Zelano & Branigan

[57] ABSTRACT

A fire hydrant security system for mounting on a standpipe of a fire hydrant wherein the hydrant has a mounting surface with holes therethrough and a bonnet mounted on the mounting surface, the bonnet surrounding a valve operating spindle assembly. The system includes a security gap which is surrounded by a protective collar spaced from the security cap to define an annular gap. An operating tool having a socket which fits into the gap and surrounds the security cap is used to couple the security cap to the valve operating spindle to open the fire hydrant. The protective collar is preferably made of forged ductile iron and is bolted to the fire hydrant by being bolted to a mounting surface on the standpipe or by being secured by bolts to the bonnet. The security cap is thus protected from blows by sledge hammers wielded by vandals and water thieves.

13 Claims, 11 Drawing Sheets

6,089,253

FIRE HYDRANT SECURITY SYSTEMS

RELATED APPLICATIONS

This application claims priority from U.S. Provisional Application No. 60/089,881 filed on Jun. 19, 1998.

FIELD OF THE INVENTION

The present invention is directed to fire hydrant security systems. More particularly, the present invention is directed to fire hydrant security systems which reinforce existing security systems when used in conjunction therewith.

BACKGROUND OF THE INVENTION

Municipal and county water departments are frequently confronted with unauthorized use of fire hydrants by members of the public who, on occasion, open the valves of the hydrants to obtain water to cool off on hot days or for the purpose of filling tank trucks with fresh water which are then sold for various purposes such as filling swimming pools and watering lawns. In cities, open fire hydrants can result in a drop in water pressure to customers, and can occasionally endanger a community by reducing the availability of water necessary to fight fires. In attempts to secure fire hydrants from unauthorized use, fire companies have employed locking devices which use magnetically operated valves. Generally, a magnetically operated valve utilizes a magnetic detent which couples a valve operating nut of a fire hydrant to a sleeve, which is normally freely rotatable with respect to the nut. The magnet is attracted by a second magnet permanently mounted in a wrench which cooperates with the sleeve to rotate the sleeve. With the help of magnets, sledge hammers and other nefarious devices, water thieves and vandals are increasingly able to defeat magnetic locking devices.

Accordingly, there is a need for improvement in magnetic locks for hydrant operating devices which minimizes the effectiveness of various techniques employed by unauthorized users to operate the valves.

In their attempt to open fire hydrants, vandals and water thieves frequently pound on fire hydrants with sledge hammers and similar devices and inflict all kinds of havoc on valve operating devices, whether those devices are magnetic or not. Accordingly, there is a need to provide an arrangement which further protects both the bonnet of fire hydrants and locking devices from vandals. It is within the purview of the problem to protect locking devices which are non-magnetic, but which require special wrench configurations to operate the devices.

SUMMARY OF THE INVENTION

It is a feature of the present invention to provide a new and improved fire hydrant security system to prevent unauthorized opening of fire hydrant valves. In view of this feature and other features, the fire hydrant security system is provided for mounting on a standpipe of a fire hydrant over top or the bonnet thereof (if the bonnet has not been removed), wherein the standpipe has a mounting flange with bolt holes therethrough to which the bonnet is secured by a plurality of spaced bolts. In accordance with the invention, a security cap is mounted on the top or bonnet for preventing rotation of a valve operating spindle assembly within the standpipe wherein the security cap has a selected diameter and height and cooperates with a collar having a diameter greater than the cap to provide an annular gap of a selected width between the security cap and collar and a height greater than the security cap. The system also includes in combination a tool for turning the spindle by activating the cap to rotatably couple with the spindle, wherein the tool has a socket with a wall having an inner diameter greater than the security cap and an outer diameter less than the inner diameter of the collar so that the socket slides axially into the gap surrounding the security cap. In the resulting system, the collar shields the security cap while allowing the socket of the tool to surround the security cap for the purpose of rotating the valve stem.

In one embodiment of the invention, the laterally extending land is an inwardly extending flange having axially extending holes adapted to receive bolts which secure the collar to the top of the fire hydrant.

In another embodiment of the invention, the collar has a plurality of legs at a pair of which have laterally extending lands having bolt holes therethrough for bolting the collar to the bonnet of the fire hydrant. In this arrangement, a pair of stabilizing legs may be disposed between the first pair of legs, the stabilizing legs engaging the surface of the bonnet.

In a third embodiment of the invention, the bonnet of the fire hydrant has a pair of pumper nozzles spaced about 90° from one another, and the collar has three legs depending therefrom, one of which is bolted to the bonnet between the pumper nozzles and the other two of which engage a peripheral flange of the bonnet.

With respect to each embodiment of the invention, the collar and legs are preferably a unitary structure, preferably made of forged ductile iron.

DETAILED DESCRIPTION

Figure 1:
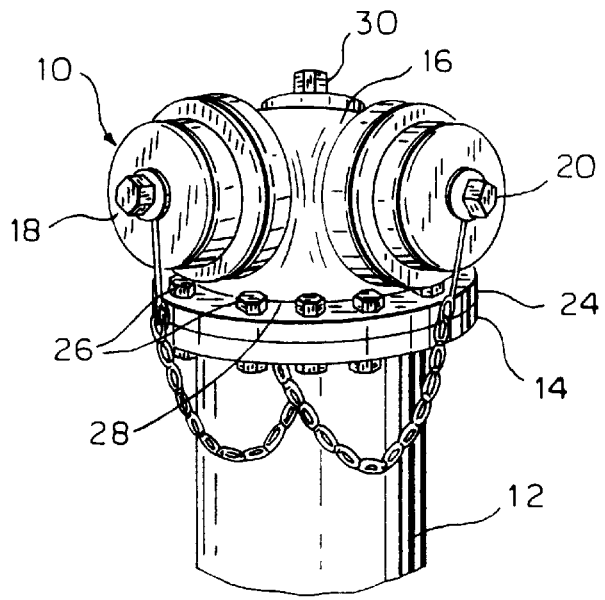
FIG. 1 is a perspective view of a fire hydrant configured in accordance with the prior art.
Figure 2:
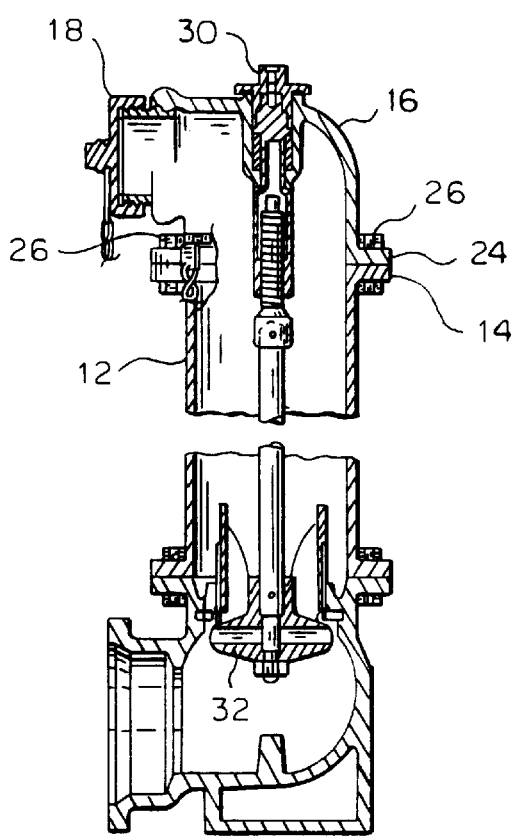
FIG. 2 is a side elevation view of the fire hydrant of FIG. 1.

Referring now to FIGS. 1 and 2, there is shown a first type fire hydrant 10 which is to be protected by utilizing a first embodiment of the security system of the present invention. The fire hydrant 10 is known as an East Jordan fire hydrant which is used in the city of Chicago. The fire hydrant 10 includes a standpipe 12 having a mounting flange 14 and a bonnet 16 having first and second pump nozzles 18 and 20 thereon. The bonnet 16 has a peripheral flange 22 having bolt holes 25 therethrough for receiving bolts 26. Between the bolts 26 there are spaces 28. A valve operating spindle 30 extends above the bonnet 16 which allows water to fill the standpipe 12 and the bonnet 16 upon turning the spindle 30 to open a valve 32 at the lower portion of the fire hydrant 10.

Figure 3:
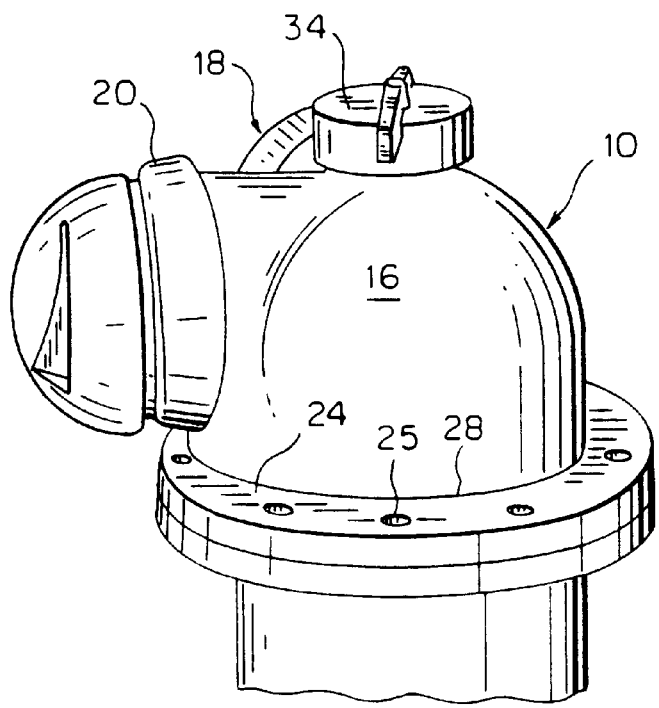
FIG. 3 is a side perspective view of a prior art arrangement for securing the fire hydrant of FIGS. 1 and 2 with a magnetic security cap.

Referring now to FIG. 3, since in order to operate the fire hydrant to release water through the nozzles 18 and 16, all one need do is to rotate the spindle 30, a security cap 34 is placed over the spindle. The security cap 34 utilizes the magnetic operating arrangement set forth in U.S. Pat. No. 5,596,893 issued Jan. 28, 1997 and assigned to the assignee of the present invention. U.S. Pat. No. 5,596,893 is hereby incorporated in this application by reference. The security cap 34 includes a magnetic coupling that couples a rotatable portion 36 within the security cap 34 to the security cap of the spindle 30 of FIG. 1 upon using a specialized magnetic wrench shown in FIGS. 7 and 8.

Figure 4:
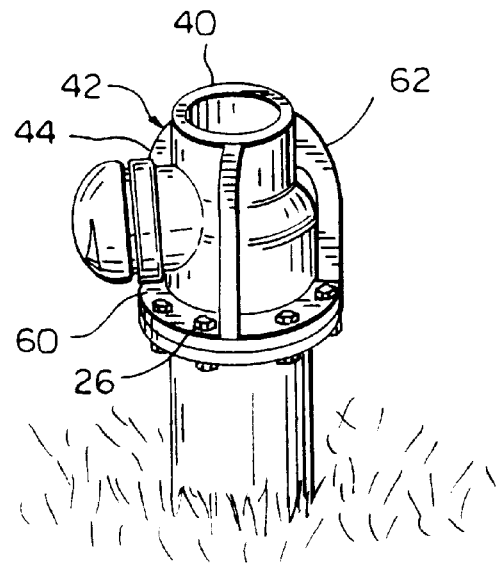
FIG. 4 is a perspective view of a security arrangement in accordance with the present invention in which a protective collar surrounds the security cap.
Figure 5:
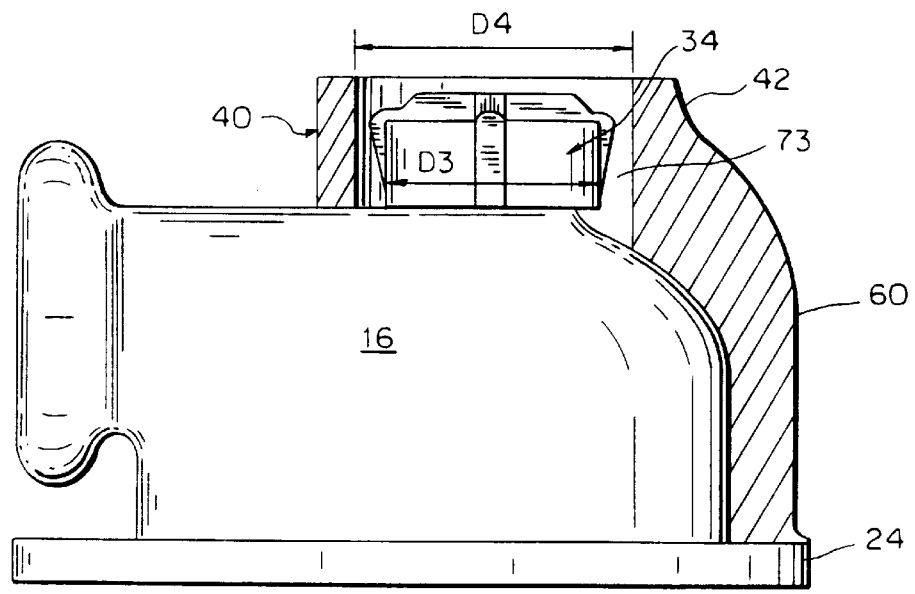
FIG. 5 is a side view of the protective collar of FIG. 4.
Figure 6:
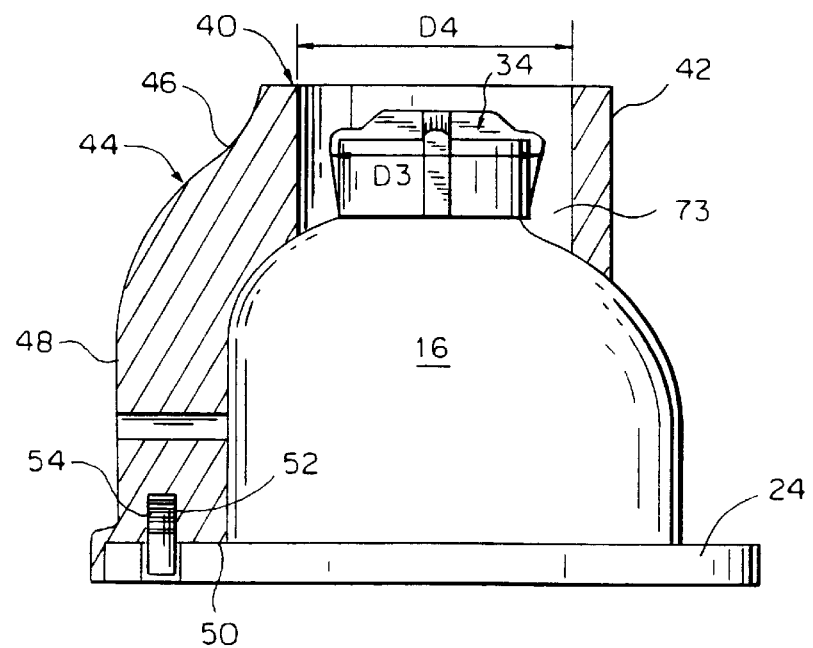
FIG. 6 is a side view of the protective collar of FIG. 5 viewed from the rear.

Referring now to FIGS. 4–6, there is shown a first embodiment of a protective collar 40 configured in accordance with the present invention which protects the security cap 34. Unfortunately, vandals and water thieves have taken to pounding the security caps 34 with sledge hammers in attempts to couple the security caps 34 to the spindles 30 (see FIG. 1). As is seen in FIG. 4, the protective collar 40 comprises a cylindrical shield 42 which surrounds and is axially aligned with the protective cap 34 so that lateral sledge hammer blows to the protective cap 34 are prevented. The cylindrical shield 42 has a first leg 44 projecting first radially outwardly therefrom over an arcuate portion 46 and then downwardly in an axially extending portion 48. The axially extending portion 48 has a land 50 thereon with a threaded bore 52. The threaded bore 52 receives the threaded shank of a bolt 54 that passes through the peripheral flange 24 of the bonnet 16. The bolt 54 retains the security collar 40 in place over the bonnet 16.

A pair of support legs 60 and 62 extend from the cylindrical shield portion 42 of the collar and have feet 64 and 66, respectively, that rest upon the flange 24 in spaces 28 between the bolts 26 (see FIG. 1). Preferably, the security collar 40 is made of forged ductile iron.

Figure 7:
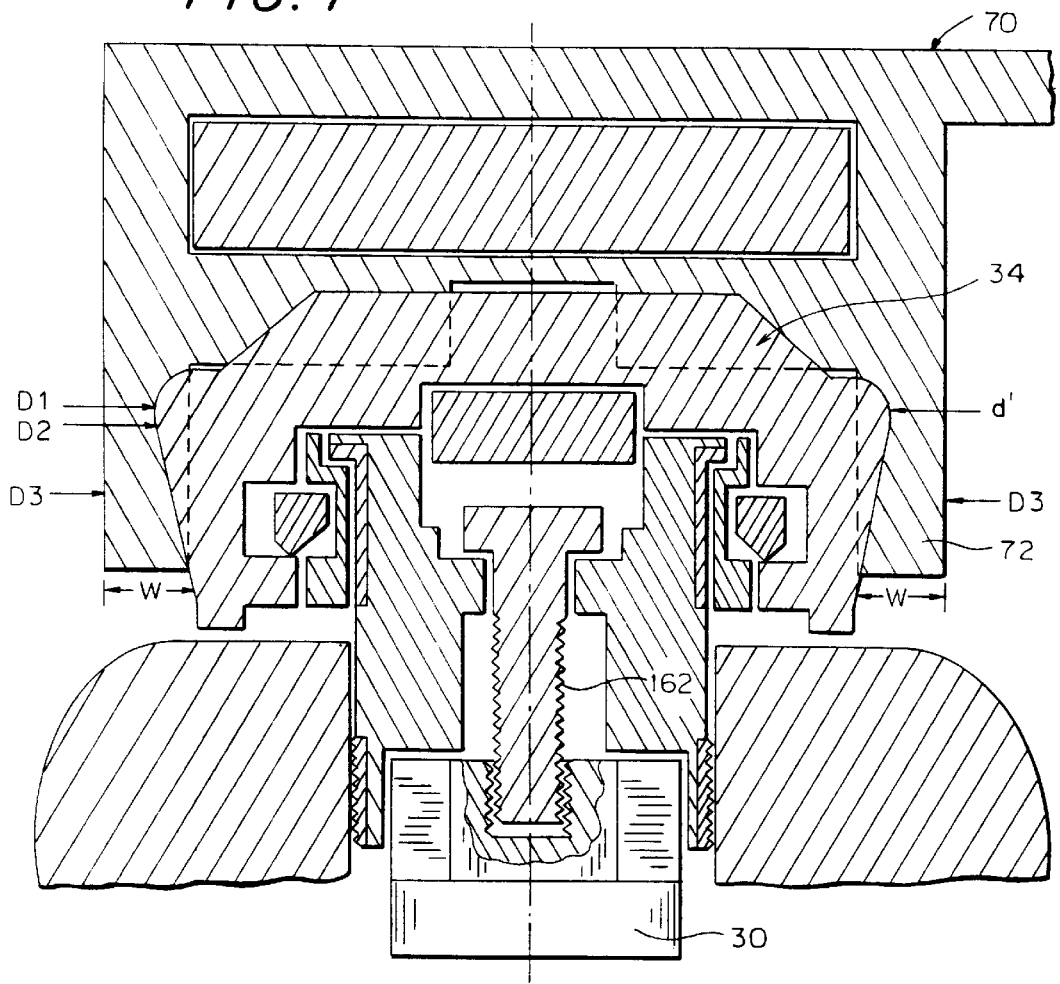
FIG. 7 is a side elevation of the security cap in combination with an operating wrench.
Figure 8:
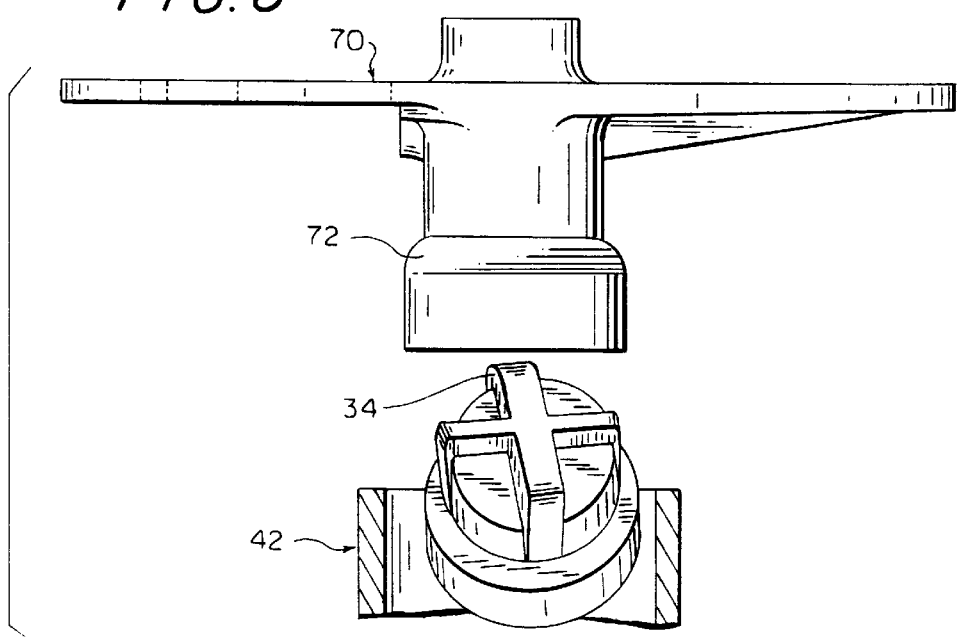
FIG. 8 is an exploded view of a protective collar, security cap and operating wrench which form a system in accordance with the present invention.

Referring now to FIGS. 7 and 8, there is shown a wrench 70, which includes a socket 72 that fits over and engages the security cap 34 in the manner set forth in U.S. Pat. No. 5,596,893, incorporated hereby by reference, so as to permit rotation of the rotatable portion 36 of the security cap and thus the spindle 30. The socket 70 has an inner diameter D1 which is greater than the outer diameter D2 of the security cap 34 and an outer diameter D3 which is less than the inner diameter D4 of the cylindrical shield 42 comprising the collar 40. Consequently, the width W of the wall 72 of socket 70 is less than the gap 73 between the cap 34 and inner diameter of the cylindrical shield 42. The security cap 34 is coupled to the spindle assembly 30 by a first magnetic element 75 that is attracted from a non-round recess 76 of the spindle by a second magnetic element 77 in the tool 70 so as to move into a non-round recess 78 in the security cap. This rotationally couples the normally uncoupled security cap 34 to the spindle assembly 30 so that rotation of the tool 70 rotates the spindle assembly.

The security cap 34 is coupled to the spindle assembly 30 by a first magnetic element 75 that is attracted from a non-round recess 76 of the spindle by a second magnetic element 77 in the tool 70 so as to move into a non-round recess 78 in the security cap. This rotationally couples the normally uncoupled security cap 34 to the spindle assembly 30 so that rotation of the tool 70 rotates the spindle assembly.

As is seen in FIG. 8, the wrench 70, security cap 34, and security collar 40 cooperate to form a security system 80 for fire hydrants which according to the invention is used with the "Chicago style" hydrant 10 of FIGS. 1–7 or with other types of fire hydrants such as those in the embodiments of FIGS. 9–12 and 13–17.

Figure 9:
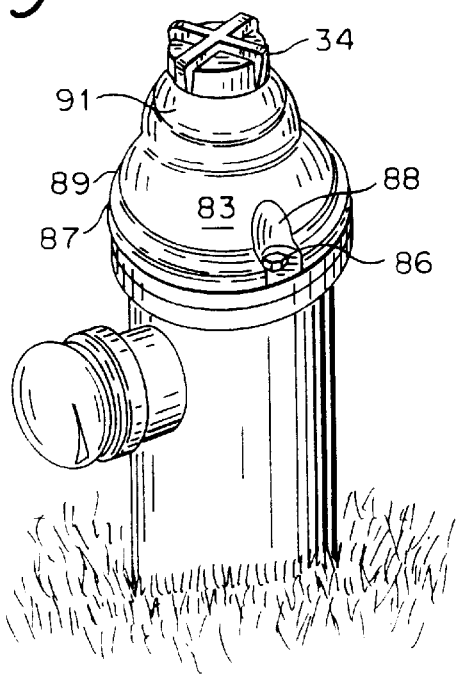
FIG. 9 is a perspective view of a second type of fire hydrant equipped with the security cap in accordance with prior art.

Referring now to the second embodiment of the invention covered in FIGS. 9–12 where "New York" style fire hydrants are secured, FIG. 9 illustrates an "AP Smith" hydrant 82. The AP Smith hydrant 82 has a bonnet 83 which is mounted on the mounting flange 84 of a standpipe 85 by bolts 86 and 87 that are received in relieved portions 88 and 89 of the bonnet to hold the bonnet on the standpipe. In this arrangement, the protective cap 34 is mounted within a shielding dome 91 to provide protection for the security cap 34. Both the security cap 34 and the shielding dome 91 are subject to lateral impacts from sledge hammers when vandals attempt to couple the protective cap 34 with a spindle within the hydrant 82 that is similar to the spindle 30 of FIGS. 1 and 2.

Figure 10:
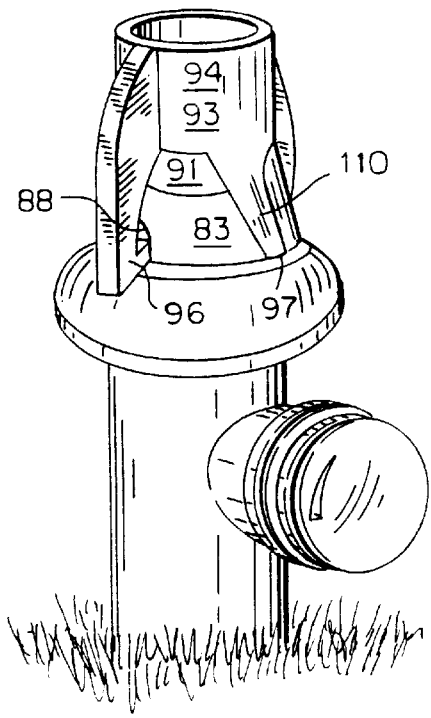
FIG. 10 is a perspective view of a protective collar used with the prior art arrangement of FIG. 9.
Figure 12:
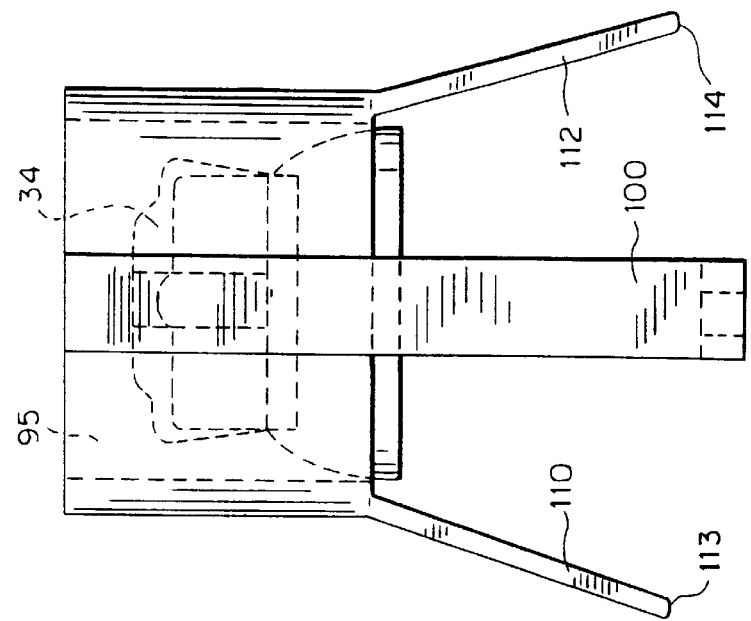
FIG. 12 is a side view of the protective collar shown in FIGS. 10 and 11.
Figure 11:
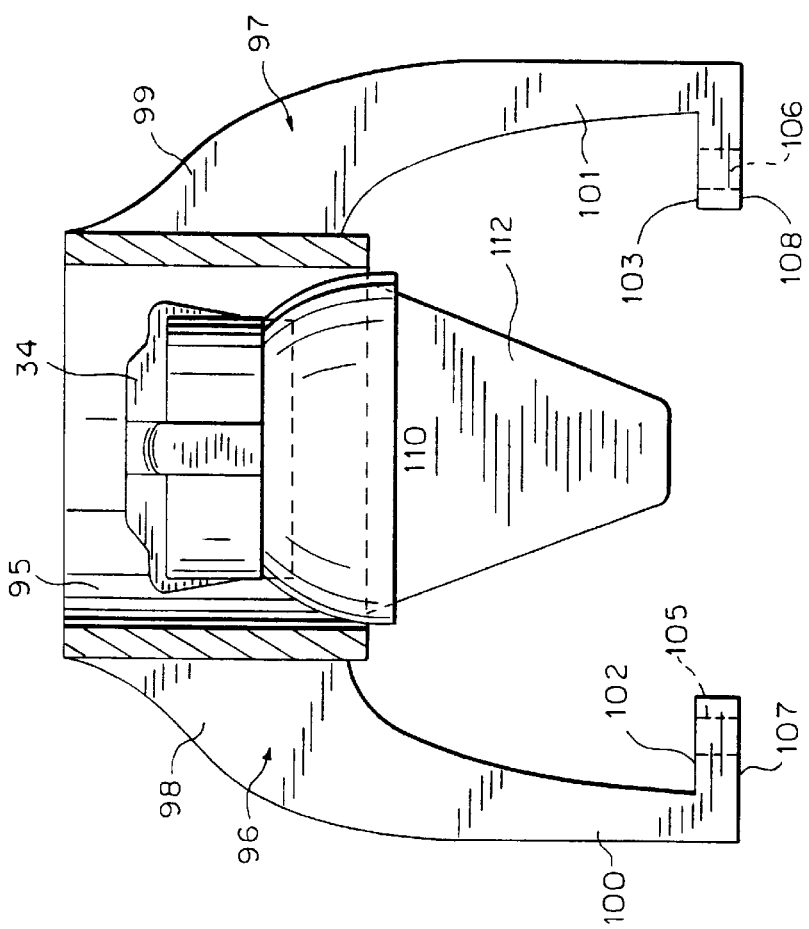
FIG. 11 is a side elevation of the protective collar used with the embodiment of FIG. 10.
Figure 13A:
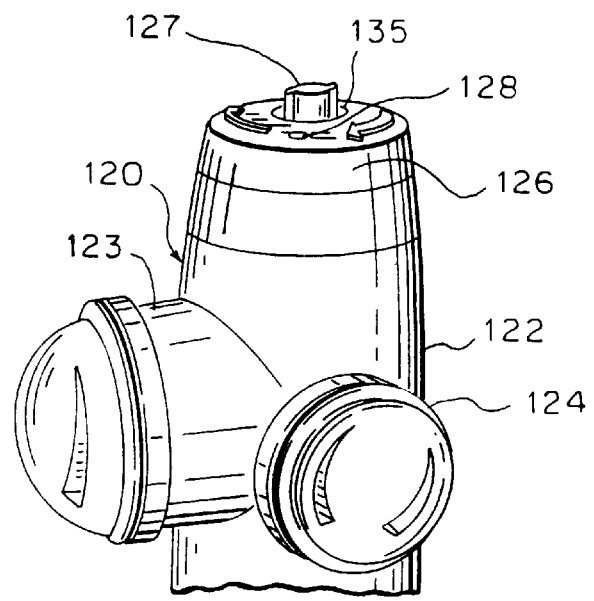
FIGS. 13A–13F are perspective views of a third type of fire hydrant in accordance with the prior art being modified to receive a protective collar in accordance with the present invention.
Figure 13B:
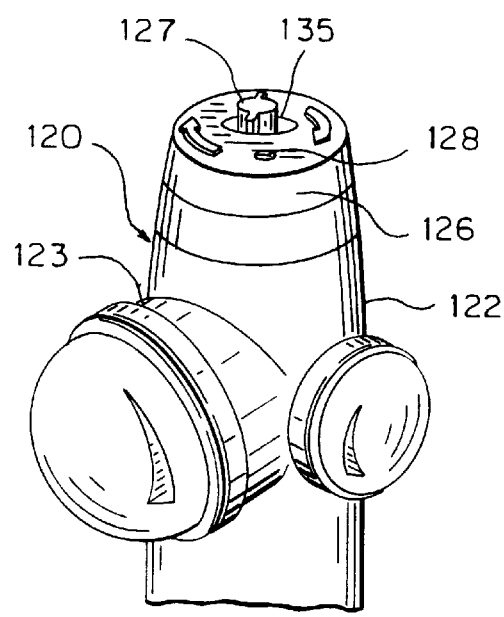
Figure 13C:
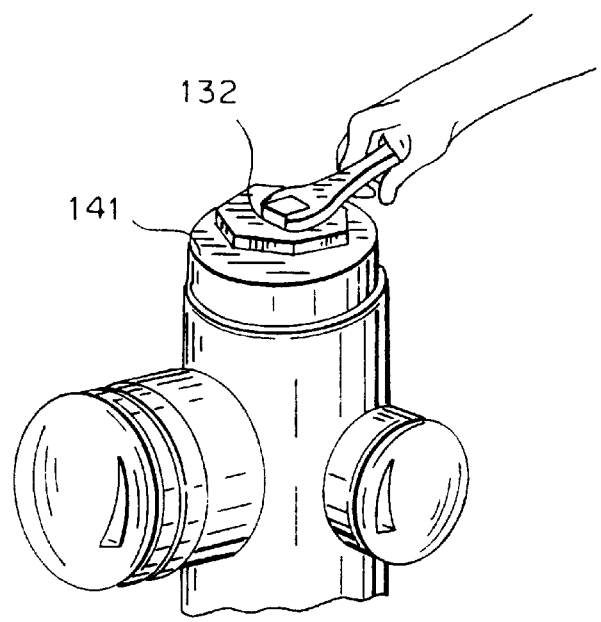
Figure 13D:
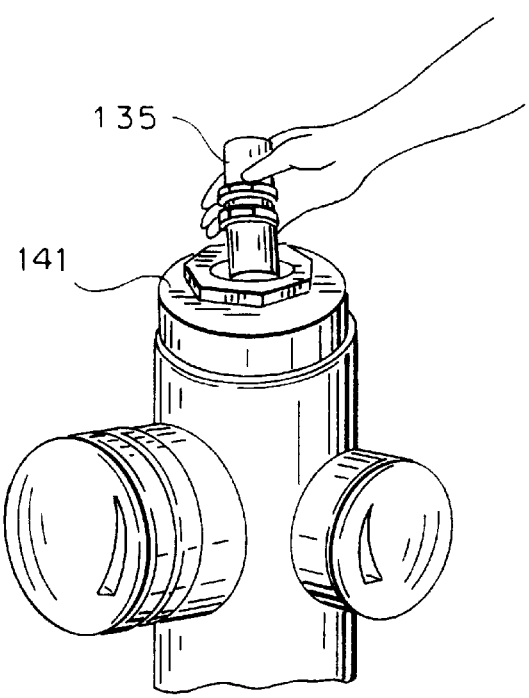
Figure 13E:
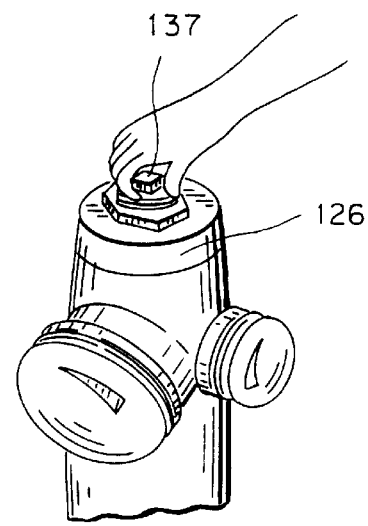
Figure 13F:
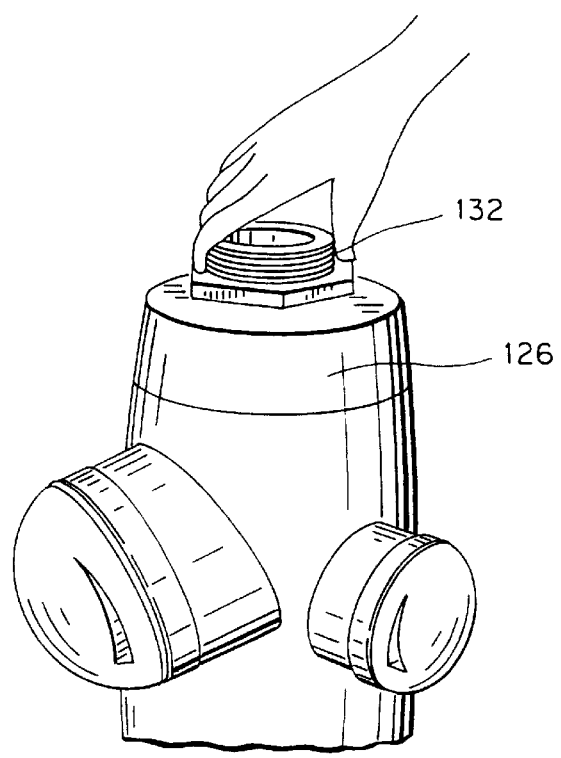

Referring now to FIGS. 10–12, in order to shield the protective cap 34 from lateral impacts with a sledge hammer, a second embodiment 93 of the protective collar in accordance with the present invention is utilized. As with the first embodiment of the invention illustrated in FIGS. 4–6, the protective collar 93 includes a cylindrical shield 94 having a gap 95 between the cap 34 and the cylindrical shield of a sufficient width to receive the socket 72 of the wrench 70 shown in FIGS. 7 and 8 so as to permit the wrench 70 to rotate the spindle within the hydrant 82.

As is clearly seen in FIGS. 11 and 12, the protective collar 93 has a first pair of legs 96 and 97 which have laterally extending portions 98 and 99, respectively, and substantially axially extending portions 100 and 101, respectively. The axially extending portions 100 and 101 have inwardly extending feet 102 and 103, respectively, that form lugs having bolt receiving holes 105 and 106, respectively, therethrough. The feet 102 and 103 are received within the relieved portions 88 and 89 of the bonnet 83 (See FIG. 9) and are secured to the bonnet by the bolts 86 and 87 which pass through the bolt holes 105 and 106 of the feet. The lands 107 and 108 formed by the bottom surfaces of the feet 102 and 103 firmly seat against the bonnet 83 upon tightening the bolts 86 and 87.

In addition to the first pair of legs 96 and 97, there are a second pair of legs 110 and 112. Oriented at 90° with respect to the first pair of legs, the second pair of legs are substantially triangular in shape and have bottom surfaces 113 and 114, respectively, which seat against an intermediate rim 116 on the bonnet 83 (see FIGS. 9 and 10).

The collar 40 comprised of the cylindrical shield 94, the first pair of legs 96 and 97, and the second pair of legs 110 and 112, is preferably a unitary structure fabricated of forged ductile iron. When the collar 40 is struck in the lateral direction with a sledge hammer, the legs 96 and 97 and the legs 110 and 112 transmit the impact to the bonnet 83 and down the standpipe 85 so as to dissipate the shock while shielding the protective cap 34.

Referring now to FIGS. 13–17 where a third type of fire hydrant 120, also known as a New York-type fire hydrant manufactured by Dresser Hydrants, is secured in accordance with the principles of the present invention. It is seen that the hydrant 120 has a standpipe 122 with a pair of nozzles 123 and 124 thereon, which standpipe is covered by a bonnet 126. As is seen in FIG. 13A, the bonnet 126 is secured by bolts 127 and 128 to a flange (not shown) of a top of the standpipe 122. In order to install an arrangement in accordance with the present invention, the bonnet 126 is removed by backing out the bolts 127,128 to reveal a stem retainer nut 132 (See FIG. 13B). The stem retainer nut 132 is removed to allow the stem 135 to be extracted (see FIGS. 13C and 13D). The stem 135 is then replaced with a stem nut 137 (FIG. 13E) that has been drilled and tapped to receive a mounting bolt and the stem retainer nut replaced (FIG. 13F).

Figure 14:
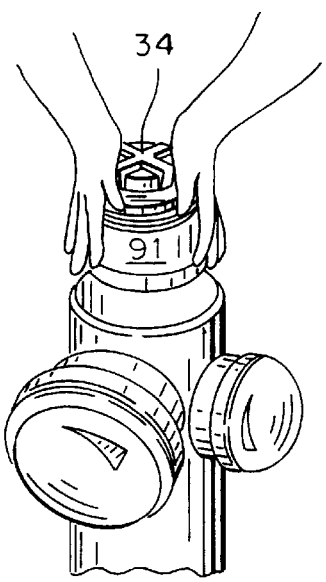
FIG. 14 is a perspective view of third type of fire hydrant in accordance with the prior art upon which a security cap is mounted.
Figure 15:
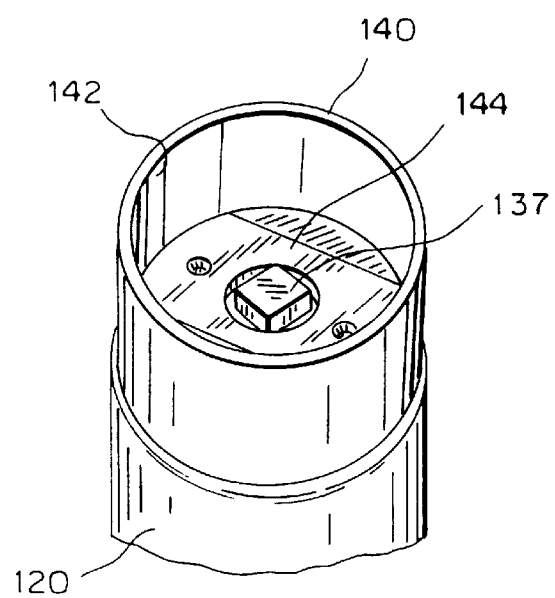
FIG. 15 is a top perspective view of the third embodiment of a protective collar according to the present invention mounted on the bonnet of the fire hydrant of FIG. 13, prior to installing the security cap shown in FIG. 14.
Figure 16:
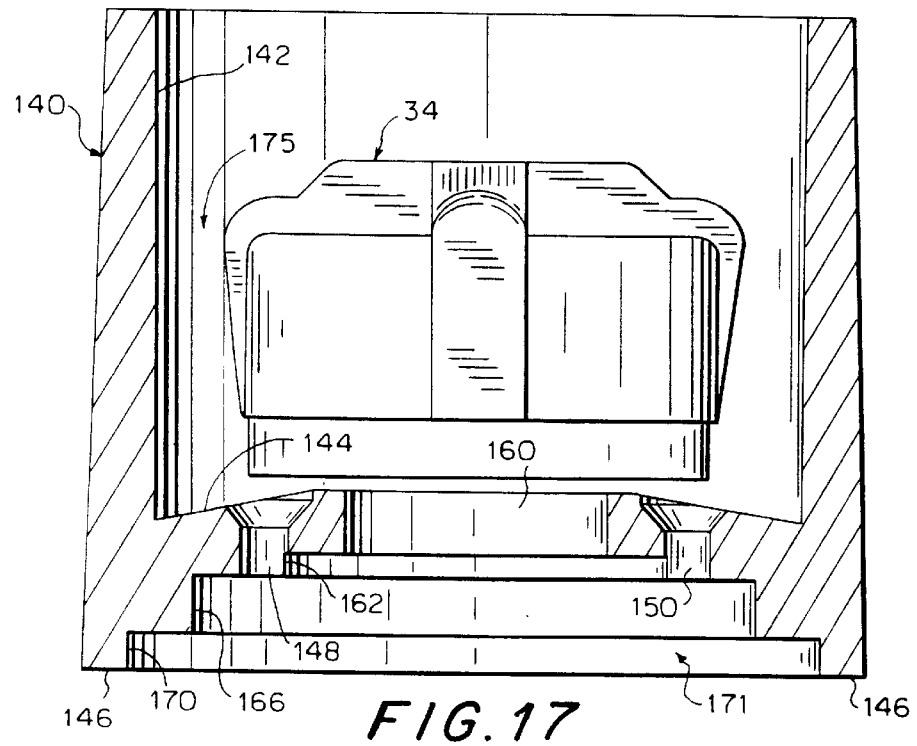
FIG. 16 is a side elevation of the third embodiment of the protective collar shown in FIG. 15.
Figure 17:
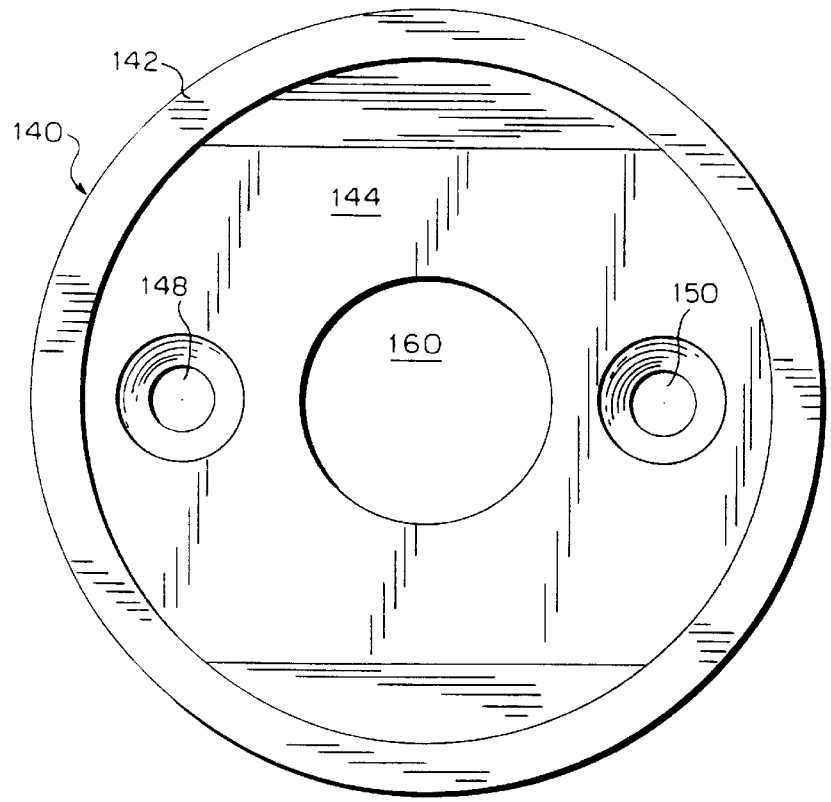
FIG. 17 is a top view of the protective collar shown in FIGS. 15 and 16.

As is seen in FIGS. 14 and 15, a protective collar 140 configured in accordance with the present invention is placed onto the top mounting surface element 141 of the fire hydrant. The protective collar 140 includes a substantially cylindrical shield 142 having a mounting strap 144 extending across the cylindrical shield 142 at a location proximate the bottom edge 146 thereof. As is seen in FIG. 16, the strap has a pair of bolt holes 148 and 150 therethrough which receive bolts 152 and 154 hold the strap in abutment with the top mounting surface element 141 of the standpipe on which the bonnet 126 was previously mounted. The mounting strap 144 has a circular opening 160 through which the drilled stem nut rejects for receiving a bolt 162 that holds the components of the protective cap 34 in place. (See FIG. 7) A first step 162 in the bottom of the mounting strap 144 accommodates a projecting portion 163 of the stem nut (See FIG. 14). A second step 166 receives a projecting hex nut 167 which projects up from the top mounting surface element 141 of the standpipe. A third step 170 is annular and overlies the top mounting surface element 141 on the standpipe so that the top surface element nests within the security collar 140. The steps 162, 166, 170 define an annular structure which provides a socket 171 for receiving the top mounting surface element 141 on the standpipe 122.

After the security collar 140 has been installed, the security cap 34 is assembled in accordance with FIG. 7 so as to leave a gap 175 between the outer diameter of the protective cap and the inner diameter of the cylindrical shield 142. The gap 175 is sufficient to accommodate the wall 72 of the wrench 70 (see FIGS. 7 and 8) so that the wrench 70 can rotate the security cap 34 and thus the spindle secured to the security cap. The protective collar 140 shields the security cap 34 from lateral sledge hammer blows and thus prevents vandals and water thieves from damaging the protective cap in a way that allows opening of the fire hydrant 120.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

What is claimed:

1. A fire hydrant security system for mounting on a standpipe of a fire hydrant having a mounting surface with bolt holes therethrough as well as a bonnet mounted on the mounting surface, the bonnet surrounding a valve operating spindle assembly, which includes a spindle, the arrangement comprising a security cap disposed over the operating spindle assembly, the security cap including a normally disengaged coupler for normally preventing rotation of the spindle by the security cap so that the security cap rotates freely thereon, the security cap having a selected diameter and height;

a protective collar having a diameter greater than the security cap to provide an annular gap of a selected width between the security cap and protective collar, the protective collar, having a height greater than the security cap and completely surrounding the security cap;

at least a pair of legs each having a foot with a laterally extending land, the legs being rigidly associated with the protective collar and the lands being bolted to the mounting surface on the standpipe; and a tool for turning the spindle including an activator for cooperatively activating the coupler to rotationally couple the security cap to the spindle, the tool including a socket having a wall of an inner diameter greater than the security cap and an outer diameter less than the inner diameter of the protective collar, wherein the socket slides axially into the gap surrounding the security cap, whereby the protective collar shields the security cap by totally surrounding the security cap while allowing the socket of the tool to surround the security cap for rotating the spindle upon activating the coupler between the security cap and spindle so that the security cap does not rotate freely with respect to the spindle.

2. The fire hydrant security system of claim 1, wherein the laterally extending land is on an inwardly extending plate having axially extending holes adapted to receive bolts extending into the mounting surface on the standpipe.

3. The fire hydrant security system of claim 2, wherein the protective collar has a cylindrical shield extending above the inwardly extending plate in which the security cap is positioned and a socket extending below the plate which receives therein the mounting surface of the standpipe.

4. The fire hydrant security system of claim 3, wherein socket is stepped to conform to the shape of the mounting surface of the standpipe.

5. The fire hydrant security system of claim 2, wherein the protective collar is unitary and is made of forged ductile iron.

6. The fire hydrant security system of claim 1, wherein each laterally extending land has a hole therethrough for receiving a bolt to secure the protective collar to the bonnet.

7. The fire hydrant security system of claim 6, wherein the bonnet includes a pair of pumper nozzles spaced 90° from one another and a base flange aligned with the mounting surface of the standpipe, the base flange being secured to the mounting surface by a plurality of bolts separated by spaces, and wherein there are three legs extending from the collar, one of which is adapted to receive the bolt extending upwardly through the flange at a location between the pair of pumper nozzles and the others of which have feet which are adapted to seat against the base flange of the bonnet in spaces between the bolts at locations circumferentially spaced from the pumper nozzles.

8. The fire hydrant security system of claim 7, wherein the protective collar and legs are unitary and made of forged ductile iron.

9. The fire hydrant security system of claim 6, wherein there are four legs, two of which have lands with bolt holes therethrough for being bolted to the bonnet and two of which have lower ends which seat against the bonnet.

10. The fire hydrant security system of claim 9, wherein the lands are inwardly extending flanges on legs which are 180° apart.

11. The fire hydrant security system of claim 10, wherein the collar and legs are unitary and made of forged ductile iron.

12. The fire hydrant security system of claim 9, wherein the collar and legs are unitary and made of forged ductile iron.

13. The fire hydrant security system of claim 1 wherein the coupler and the activator are magnetic elements.

* * * * *